J. F. McELROY.
CIRCUIT CONTROLLING THERMOSTAT.
APPLICATION FILED JUNE 1, 1911.
1,063,369.
Patented June 3, 1913.
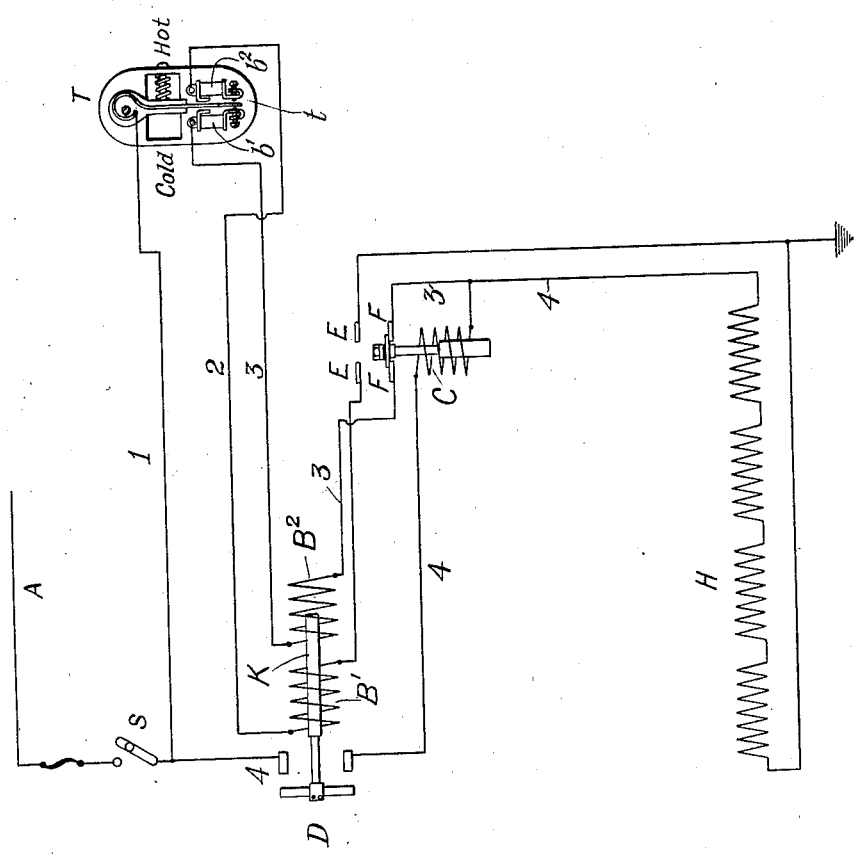

UNITED STATES PATENT OFFICE.

JAMES F. McELROY, OF ALBANY, NEW YORK, ASSIGNOR TO CONSOLIDATED CAR-HEATING COMPANY, A CORPORATION OF WEST VIRGINIA.

CIRCUIT-CONTROLLING THERMOSTAT.

1,063,369.   Specification of Letters Patent.   Patented June 3, 1913.

Application filed June 1, 1911. Serial No. 630,679.

*To all whom it may concern:*

Be it known that I, JAMES F. MCELROY, a citizen of the United States, residing at Albany, county of Albany, State of New York, have invented certain new and useful Improvements in Circuit-Controlling Thermostats, the following being a full, clear, and exact disclosure of the one form of my invention which I at present deem preferable.

For a detailed description of the present form of my invention, reference may be had to the following specification and to the accompanying drawings, which illustrate my invention.

The drawing shows a diagram of my thermostat and circuits controlled thereby.

My invention relates to a thermostat for controlling electric circuits, such, for instance, as an electric heater circuit, and it is particularly designed to operate on circuits of high voltage which require that magnets connected thereto shall be of high resistance and contain many turns of fine wire, so that it is inexpedient to maintain them constantly in circuit. The thermostat itself, including its maintaining coils, may however be employed in any other situation for which it may be available.

Referring to the drawing which shows the thermostat, the tongue $t$ thereof is formed of two strips of different metals such as brass and iron constituting a compound strip. The iron strip in the thermostat tongue is continued down opposite the poles of two magnets $b^1$ and $b^2$, while the brass strip terminates at a point above the said poles. By this means the iron portion of the tongue becomes an armature upon which either of the magnets may act. At its lower extremity the tongue is provided with a German silver contact block adapted to touch one or the other of the contact screws X Y which are passed through both branches of a loop of magnetic metal forming the magnetic pole pieces of each magnet, the loop acting by its slight resiliency to lock the screw in any position in which it may be set. This contact block, together with the contact screws or terminals X and Y form two sets of contacts closed alternately by the thermostat.

For illustration I have shown the thermostat as operating on an electric heater employed for heating an apartment, such as a railway car. Any other device, for instance, an electromagnet, may be similarly controlled by the thermostat. The electric heater is indicated at H and the thermostat at T.

A is the main supply wire for the heater, which may be referred to as the line side of the main circuit, and from this supply wire are also derived the thermostat-controlling circuits by which the current to the heater is dominated. All of these circuits are controlled by the manual switch S. The circuit to the heater passes from the switch S to the dominating switch D and thence, when the dominating switch is closed, through the coil of a magnet C to the heater H. From the switch S the circuit 1 leads to the tongue $t$ of the thermostat T which makes contact on either side with the terminals formed by the aforesaid screws X and Y of the two other circuits marked 2 and 3 respectively which lead to the opposite side of the main circuit. Of these two circuits the former (2) passes through the small magnet $b^2$ at the thermostat and goes thence to the switch-operating coil $B^1$ and thence through the contacts E E, controlled by the coil C, to the ground or opposite side of the main circuit. The other of the two circuits (3) passes through the small magnet $b^1$ of the thermostat to the switch-operating coil $B^2$ and thence through the contacts F F, also controlled by the coil C, to the heater. The coil C, which may be termed the governing coil, is shown as of the solenoid form, and when deënergized its core drops by gravity and closes the circuit across the contacts F F, but when energized its core is lifted and closes its circuit across the contacts E E, breaking at the same time the circuit at contacts F F. The operating coil $B^2$ is the one which serves to close the switch D by drawing the core K to the right, and the operating coil B is the one which acts to open the switch D by drawing the core K to the left.

The thermostat T will be exposed to the temperature of the apartment whose heat is to be regulated, and its tongue $t$, so long as the temperature is at the desired normal point, will remain out of contact with both of the contact screws X and Y. When the temperature rises, the tongue will move to the right against the contact screw Y and thereby close the aforesaid circuit 2 through the switch-opening coil B¹ and so cause the switch D to open; when the temperature falls, it will move to the left against contact X and thereby close the aforesaid circuit 3 through the switch-closing coil B². In the latter event the circuit 3 will find the contacts F F closed by the dropping of the core of governing coil C, it being remembered that at this time no current will be flowing through the heater and the coil C will therefore be deënergized. The current will consequently pass from the tongue t of the thermostat to the contact X through magnet B² and, by circuit 3, through the heater H to ground. This will energize the coil B² and cause it to draw core K to the right and close the switch D which will admit current to the heater by the circuit 4 which includes the governor coil C. The governing coil will then lift its core to break, at contacts F F, the circuit through the coil B² which has just acted, and close the circuit at contacts E E through the circuit-opening coil B¹ which will thereafter be in a condition to operate and break the heater circuit as soon as its circuit 2 shall be closed at the right hand contact Y of the thermostat by a rise of temperature sufficient to require the cutting out of the heater by the opening of switch D. The small magnets $b^1$ $b^2$ acting conjointly with the thermostat upon the respective sets of contacts are of special value in situations where the thermostat is subject to vibrations as it is in a railway car. When the thermostat tongue t touches the contacts X Y on either side, however mild the contact may be made, the current instantly passes to the corresponding magnet $b^1$ or $b^2$ which acts to draw the tongue firmly against the contact and maintain it there until the operating coil B¹ or B², whose circuit has been thereby closed, has acted and its circuit broken, as heretofore explained, by the governing-coil C. It should be noted that the coils B¹ and B² are wound with fine wire and have a considerable resistance. This will reduce the current which the thermostat tongue has to carry to a very small amount, it being impracticable to make and break large currents by so delicate an instrument. If the voltage on the main line is high, the resistance in the magnets B¹ and B² will require many turns of the fine wire and render it undesirable to maintain them permanently in circuit, or in circuit longer than may be required for their operation of the switch D. By the use of the small retaining magnets $b^1$ and $b^2$ I am enabled to make a firm and certain contact between the thermostat tongue and the contact screws X and Y for the transmission of the small current that flows in the circuits which pass through the tongue.

What I claim as new and desire to secure by Letters Patent is:

1. The combination with a thermostat having its movable member connected to the line side of a grounded main circuit, magnets, contacts carried by the pole pieces of the magnets and in circuit with the latter, said magnets coöperating with the thermostat to control the circuit, circuit wires leading from said magnets to ground, a motor connected with said wires so as to be reversely operated thereby, said main circuit controlled by said motor, a switch for normally completing the circuit through one of said wires to the motor when said thermostat is in engagement with one of said contacts, and magnetic means controlled by the main circuit for operating said switch to complete the circuit through the second wire to the motor when the thermostat is in engagement with the other contact, the circuit through one wire being closed by said switch simultaneously with the opening of the circuit through the other wire.

2. The combination with a grounded main electric circuit, of a thermostat, a connection between one side of said circuit and the movable member of the thermostat, two contacts either of which may be engaged by said movable member, two conductors leading from said contacts respectively, two retaining magnets for said movable member each connected with one of the two conductors aforesaid, two oppositely acting magnetic coils each of which is also connected with one of the two conductors aforesaid, a switch controlled by said coils, and means controlled by said switch for connecting either of said conductors to the ground side of the main circuit.

3. The combination with a grounded main circuit, of a translating device therein, a switch controlling said device, circuits which shunt said switch, electro-magnets of high resistance included in said shunt circuits for operating said switch, a thermostat having its contact tongue connected to the line side of said switch, contacts forming the respective terminals of said shunt circuits and arranged to be engaged alternately by said contact tongue, retaining magnets for said contact tongue one in each of said shunt circuits, and a magnet in series with said translating device and controlling the shunt circuits.

4. The combination with a grounded main circuit, of a translating device therein, a switch controlling said device, circuits which shunt said switch and of which one is in series with said translating device, electromagnets of high resistance included in said shunt circuits for operating said switch, a thermostat having its contact tongue connected to the line side of said switch, contacts forming the respective terminals of said shunt circuits and arranged to be engaged alternately by said contact tongue, retaining magnets for said contact tongue one in each of said shunt circuits, and a magnet in series with said translating device and controlling the shunt circuits.

In witness whereof I have hereunto set my hand, before two subscribing witnesses, this 29th day of May, 1911.

JAMES F. McELROY.

Witnesses:
ERNEST D. JANSEN,
JOHN A. McELVENEY.